United States Patent
Lambert

(10) Patent No.: US 9,647,875 B1
(45) Date of Patent: May 9, 2017

(54) BLOOM FILTERS WITH VARIABLE HASH

(71) Applicant: MARVELL INTERNATIONAL LTD., Hamilton (BM)

(72) Inventor: Paul A. Lambert, Mountain View, CA (US)

(73) Assignee: Marvell International Ltd., Hamilton (BM)

(*) Notice: Subject to any disclaimer, the term of this patent is extended or adjusted under 35 U.S.C. 154(b) by 287 days.

(21) Appl. No.: 14/215,141

(22) Filed: Mar. 17, 2014

Related U.S. Application Data

(60) Provisional application No. 61/792,203, filed on Mar. 15, 2013.

(51) Int. Cl.
*G06F 13/00* (2006.01)
*H04L 12/24* (2006.01)

(52) U.S. Cl.
CPC .................. *H04L 41/00* (2013.01)

(58) Field of Classification Search
CPC ........... H04L 41/0213; H04L 29/08072; H04L 29/06; H04L 41/22; H04L 41/12; H04L 41/00
USPC ........................................................ 709/223
See application file for complete search history.

(56) References Cited

U.S. PATENT DOCUMENTS

2013/0339526 A1* 12/2013 Ruellan ............... H04L 67/2814
709/226

OTHER PUBLICATIONS

"Wi-Fi Display Technical Specification Version 1.0.0", Wi-Fi Alliance® Technical Committee, Wi-Fi Display Technical Task Group, Aug. 24, 2012, 149 pages.
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

(Continued)

*Primary Examiner* — Robert B Harrell

(57) ABSTRACT

In a method of performing discovery, at least a plurality of identifiers associated with a plurality of respective communication devices is processed, using a first hash function, to generate a first bit string. The first bit string is indicative of whether each of the plurality of identifiers is included in a group. An indication that a new hash function should be used is detected, and, in response to detecting the indication that a new hash function should be used, at least the plurality of identifiers is processed, using a second hash function different than the first hash function, to generate a second bit string. The second bit string is indicative of whether each of the plurality of identifiers is included in the group.

18 Claims, 8 Drawing Sheets

(56) References Cited

OTHER PUBLICATIONS

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

"Wi-Fi Peer-to-Peer (P2P) Technical Specification, Version 1.00", Wi-Fi Alliance, pp. 1-135, Dec. 1, 2009.

\* cited by examiner

US 9,647,875 B1

BLOOM FILTERS WITH VARIABLE HASH

CROSS-REFERENCE TO RELATED APPLICATION

This claims the benefit of U.S. Provisional Patent Application No. 61/792,203, entitled "Bloom Filters with Variable Hash" and filed on Mar. 15, 2013, the disclosure of which is hereby incorporated herein by reference.

FIELD OF THE DISCLOSURE

The present disclosure relates generally to communication networks and, more particularly, to discovery procedures within communication networks.

BACKGROUND

In some wireless communication networks, procedures are provided that allow a first device to discover other nearby devices that provide a service. For example, various service discovery protocols can be used by low-power devices configured to communicate with other devices in 802.11-based WiFi networks. In some such systems, a first device broadcasts a request for a particular service (e.g., a printing, music, gaming, or other service), and nearby devices that hear the request (and support the requested service) send a response indicating that the device supports the service. To ensure that responses from nearby devices are not missed, and that new devices are accounted for, multiple rounds of discovery requests and responses may be sent by the devices. To reduce the number of these discovery messages, broadcast requests may include identification data indicating those devices that have already been successfully discovered (i.e., successfully identified as supporting the requested service). If a device sees that it has already been discovered, there is no need to transmit additional discovery messages in response to future requests. While this approach can reduce the number of discovery messages that are exchanged, the identification data can be lengthy and generate significant overhead. Using fewer bits to more compactly represent the identification data, however, can lead to ambiguity. In particular, a device may erroneously conclude, based on the abbreviated identification data, that the device has already been discovered.

SUMMARY

In an embodiment, a method of performing discovery is implemented in a first communication device. The method includes processing, in the first communication device and using a first hash function, at least a plurality of identifiers associated with a plurality of respective communication devices to generate a first bit string. The first bit string is indicative of whether each of the plurality of identifiers is included in a group. The method also includes detecting, at the first communication device, an indication that a new hash function should be used, and, in response to detecting the indication that a new hash function should be used, processing, in the first communication device and using a second hash function different than the first hash function, at least the plurality of identifiers to generate a second bit string. The second bit string is indicative of whether each of the plurality of identifiers is included in the group.

In another embodiment, a non-transitory, tangible, computer-readable memory stores instructions that, when executed by one or more processors in a first communication device, cause the one or more processors to process, using a first hash function, at least a plurality of identifiers associated with a plurality of respective communication devices to generate a first bit string. The first bit string is indicative of whether each of the plurality of identifiers is included in a group. The instructions also cause the one or more processors to detect an indication that a new hash function should be used, and, in response to detecting the indication that a new hash function should be used, process, using a second hash function different than the first hash function, at least the plurality of identifiers to generate a second bit string. The second bit string is indicative of whether each of the plurality of identifiers is included in the group.

In another embodiment, a method of performing discovery is implemented in a first communication device. The method includes processing, in the first communication device and using a first hash function, an identifier associated with the first communication device to generate a first bit string. The method also includes comparing, in the first communication device, the first bit string to a second bit string received from a second communication device to determine whether the identifier is included in a group, detecting, at the first communication device, an indication that a new hash function should be used, processing, in the first communication device and using a second hash function different than the first hash function, the identifier to generate a third bit string, and comparing, in the first communication device, the third bit string to a fourth bit string received from the second communication device to determine whether the identifier is included in the group.

In another embodiment, a non-transitory, tangible, computer-readable memory stores instructions that, when executed by one or more processors in a first communication device, cause the one or more processors to process, using a first hash function, an identifier associated with the first communication device to generate a first bit string, compare the first bit string to a second bit string received from a second communication device to determine whether the identifier is included in a group, detect an indication that a new hash function should be used, process, using a second hash function different than the first hash function, the identifier to generate a third bit string, and compare the third bit string to a fourth bit string received from the second communication device to determine whether the identifier is included in the group.

BRIEF DESCRIPTION OF THE DRAWINGS

Like reference numbers in different figures represent like elements.

DETAILED DESCRIPTION

Figure 1:
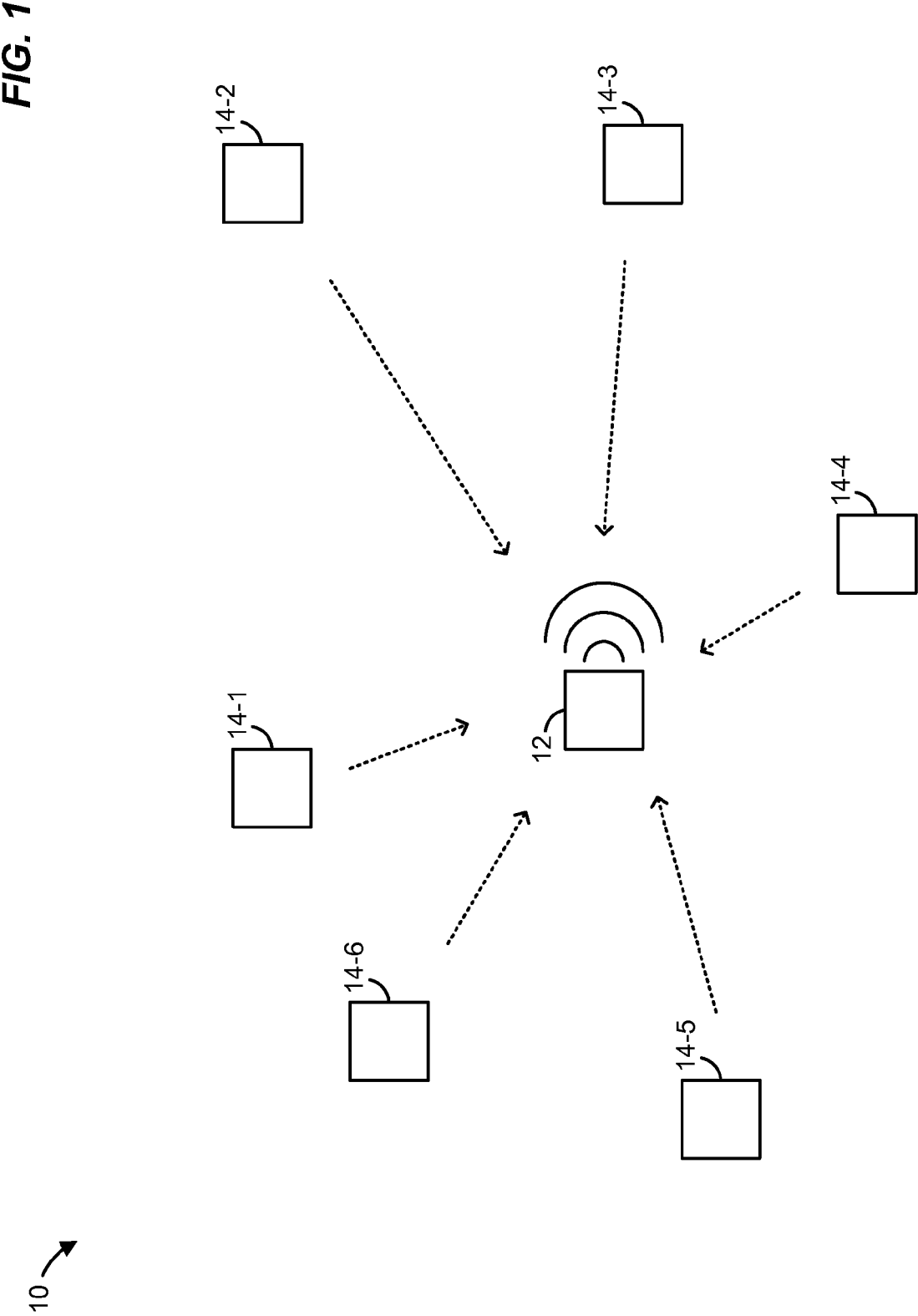
FIG. 1 is a block diagram of an example system in which discovery techniques described herein are implemented, according to one embodiment and scenario.

In embodiments described below, Bloom filters are used in the discovery process to indicate group membership. In some embodiments, for example, Bloom filters are used to compactly represent devices that provide a desired service and have already been successfully discovered/identified. A Bloom filter is a bit string that can be generated by performing a hash function on each of one or more inputs (e.g., device identifiers), and then mapping a portion of each resulting hash to a respective bit location in the bit string. While Bloom filters do not provide false negatives, false positives (i.e., false indications that a particular input is indeed a group member) may result, with the probability of a false positive decreasing as the length of the Bloom filter increases.

In some embodiments, a first device that seeks to discover other devices supporting a desired service maintains a Bloom filter to represent discovered devices, and occasionally updates the Bloom filter to reflect changes in the list of discovered devices. In some embodiments, the current Bloom filter is included in service discovery requests, thereby allowing other devices to determine whether those devices have already been discovered. In one embodiment, for example, a second device receiving a Bloom filter in a discovery request can compare the received Bloom filter with a locally-generated Bloom filter. In one such embodiment, the local Bloom filter is generated at the second device by processing an identifier of the second device using the same hash function that the first device had used to generate the received Bloom filter. If the second device determines that the received Bloom filter has a "one" value at the same bit location as the local Bloom filter, the second device concludes that it has already been discovered, in an embodiment.

Due to the possibility of false positives inherent in all Bloom filters, however, a received Bloom filter may erroneously indicate that an undiscovered device has already been discovered. In some embodiments and scenarios, this problem is mitigated by applying different hash functions, and thereby generating different Bloom filters, for the same device identifier. In one embodiment and scenario, for example, each identifier in a set of identifiers (associated with a set of devices from which discovery responses have been received) is hashed using a first hash function to generate a first Bloom filter, and is later hashed using a different, second hash function to generate a second Bloom filter. In an embodiment, both the discovering device and the devices responding to the discovery request(s) are made aware of which hash function is currently being used, so that the responding devices can compare received Bloom filters with corresponding local Bloom filters. In this manner, in some embodiments, the probability of incurring a false positive can be made negligibly small. If the probability of a false positive using a single hash function is P, for example, the use of N successive uncorrelated hash functions reduces the probability according to $P^N$, which rapidly approaches zero as N increases.

FIG. 1 is a block diagram of an example communication system 10 in which discovery techniques described herein are implemented, according to one embodiment and scenario. FIG. 1 shows an embodiment and scenario in which the example communication system 10 includes a discovering device 12, as well as six additional devices 14-1 through 14-6 being discovered by device 12. While the embodiment and scenario of FIG. 1 shows six devices 14-1 through 14-6, other embodiments and/or scenarios include more or fewer devices 14. In the example embodiment of FIG. 1, the device 12, and each of the devices 14-1 through 14-6, is a WiFi-enabled device (e.g., is configured to operate according to the IEEE 802.11a standard, IEEE 802.11n standard, IEEE 802.11ac standard, IEEE 802.11ad standard, etc.), such as a WiFi-enabled smartphone, tablet, laptop computer, desktop computer, wireless printer, etc. In other embodiments, however, the device 12, and each of the devices 14-1 through 14-6, is instead (or additionally) configured to operate according to a different wired communication protocol (e.g. an Ethernet protocol) and/or wireless communication protocol (e.g., a Bluetooth protocol). For ease of explanation, the descriptions below will generally refer to an embodiment in which the devices 12 and 14-1 through 14-6 are WiFi-enabled devices.

Generally, the discovering device 12 transmits (e.g., broadcasts) service discovery requests, and receives service discovery responses from those devices (of devices 14-1 through 14-6) that have received a service discovery request. These discovery procedures, and the contents of the various service discovery messages, are described in further detail below, according to various embodiments.

Figure 2:
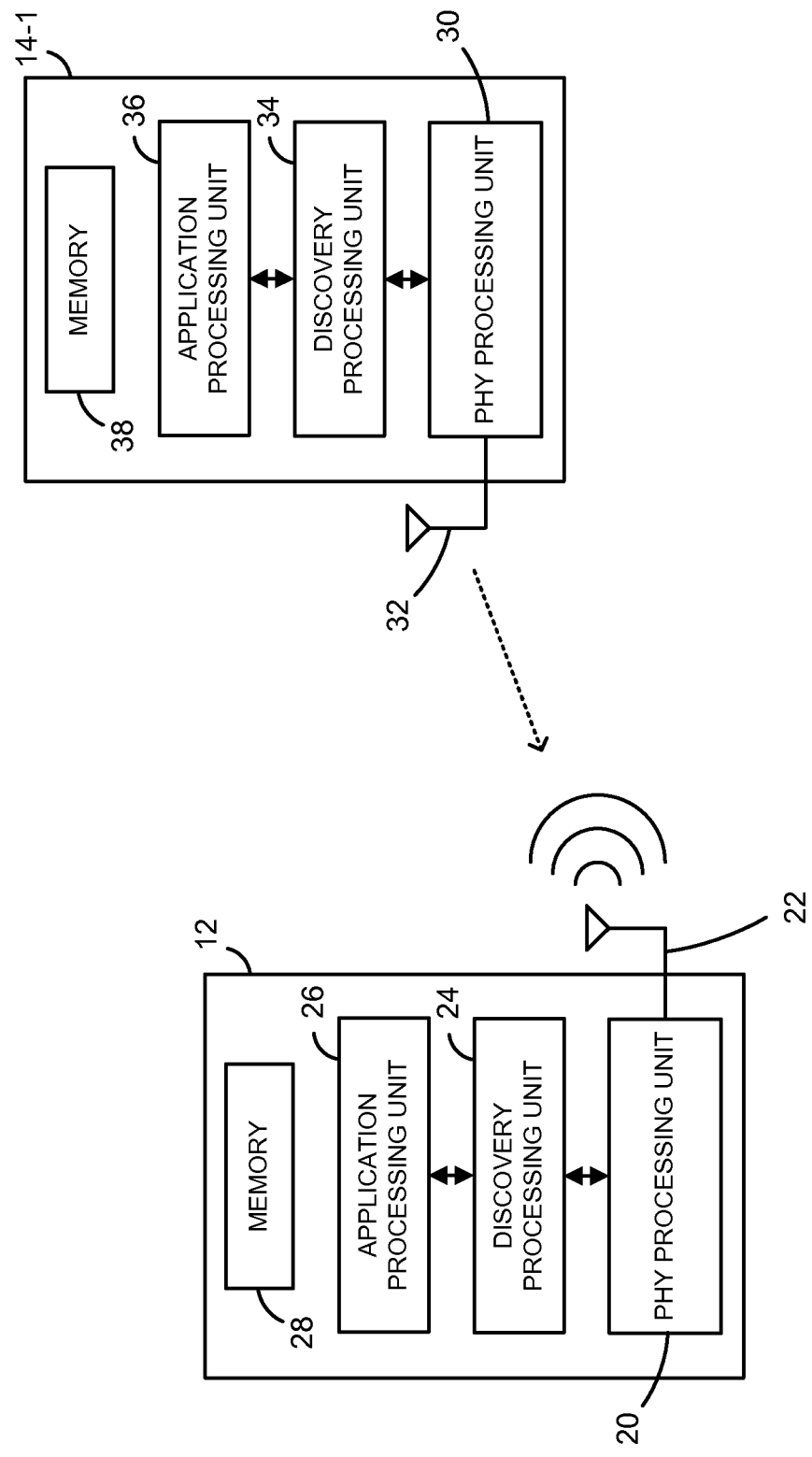
FIG. 2 is a block diagram providing additional detail of devices within the communication system of FIG. 1, according to an embodiment.

As seen in FIG. 2, device 12 includes a physical layer (PHY) processing unit 20 coupled to one or more antennas 22, a discovery processing unit 24 coupled to the PHY processing unit 20, an application processing unit 26 coupled to the discovery processing unit 24, and a memory 28. The PHY processing unit 20 is configured to perform at least Layer 1 WiFi operations for transmitting and receiving wireless signals via the antenna(s) 22, in an embodiment. In some embodiments, the PHY processing unit 20 is a physical/tangible processor, or a group of physical/tangible processors. In various different embodiments, for example, the PHY processing unit 20 includes one or more hardware processors, such as one or more processors on one or more integrated circuits (e.g., application-specific integrated circuits (ASICs), programmable logic devices, etc.), and/or includes one or more processors (e.g., a central processing unit (CPU) or a dedicated processor) that is/are configured to read and execute software or firmware instructions stored in memory 28 (or another memory not shown in FIG. 2).

In an embodiment, the discovery processing unit 24 is configured to perform at least Layer 2 and/or Layer 3 WiFi service discovery operations. These operations are discussed in more detail below, according to various embodiments. In an embodiment, the discovery processing unit 24 is also configured to perform other Layer 2 and/or Layer 3 WiFi operations, such as device discovery, connection and set-up. In some embodiments, the discovery processing unit 24 is configured to implement peer-to-peer (P2P) and/or tunneled direct link setup (TDLS) discovery functions.

The discovery processing unit 24 is a physical/tangible processor, or a group of physical/tangible processors, according to various embodiments. In various different embodiments, for example, the discovery processing unit 24 includes one or more hardware processors, such as one or more processors on one or more integrated circuits (e.g., ASICs, programmable logic devices, etc.), and/or includes one or more processors (e.g., a CPU or a dedicated processor) that is/are configured to read and execute software or firmware instructions stored in memory 28 (or another memory not shown in FIG. 2).

In an embodiment, the application processing unit 26 is configured to execute applications that can utilize one or more services provided by other devices within communication system 10 (e.g., any one or more of devices 14-1 through 14-6). In various embodiments, for example, the application processing unit 26 executes an application that finds/identifies "friends" who are nearby (e.g., where other nearby devices that execute the same application provide a service by responding to scans/queries for friends), an application that generates content (e.g., a word processing application) that can be printed by another device within communication system 10, an application that provides content (e.g., music, photographs, video, etc.) that can be played or displayed by another device within communication system 10, an application that determines or displays location information based on location data provided by other devices within communication system 10, a gaming application that can accept inputs from (and/or provide outputs to) gaming services/applications of other devices within communication system 10, etc. In some embodiments, the application processing unit 26 is also configured to execute applications that provide one or more services that may be utilized by other devices within communication system 10 (e.g., any of devices 14-1 through 14-6), such as printing services, media display services, gaming services, etc. The application processing unit 26 is a physical/tangible processor, or a group of physical/tangible processors, according to various embodiments. In one embodiment, for example, the application processing unit 26 includes one or more processors (e.g., a CPU or a dedicated processor) that is/are configured to read and execute software or firmware instructions stored in memory 28 (or another memory not shown in FIG. 2).

While FIG. 2 shows the PHY processing unit 20, the discovery processing unit 24 and the application processing unit 26 as separate processing units, it is understood that, in some embodiments, a single physical/tangible processor implements the functionality of the PHY processing unit 20, the discovery processing unit 24, and/or the application processing unit 26, or that the functionality of the PHY processing unit 20, the discovery processing unit 24, and/or the application processing unit 26 is distributed across the same group of physical/tangible processors.

In an embodiment, the memory 28 is a non-transitory, tangible, computer-readable memory that includes one or more volatile and/or nonvolatile memories, such as a random access memory (RAM) and/or a read-only memory (ROM), for example. As noted above, the memory 28 in some embodiments stores instructions that are executed by the application processing unit 26, the discovery processing unit 24, and/or the PHY processing unit 20. Additionally (or alternatively), in some embodiments, the memory 28 stores other information, such as Bloom filters and/or device identifiers, as is discussed in further detail below.

The device 14-1 includes a PHY processing unit 30 coupled to one or more antennas 32, a discovery processing unit 34 coupled to the PHY processing unit 30, an application processing unit 36 coupled to the discovery processing unit 34, and a memory 38. The PHY processing unit 30 is configured to perform at least Layer 1 WiFi operations for transmitting and receiving wireless signals via the antenna(s) 32, in an embodiment. In an embodiment, the PHY processing unit 30 is similar to the PHY processing unit 20 of device 12.

In an embodiment, the discovery processing unit 34 is configured to perform at least Layer 2 and/or Layer 3 WiFi service discovery operations. These operations are discussed in more detail below, according to various embodiments. In an embodiment, the discovery processing unit 34 is also configured to perform other Layer 2 and/or Layer 3 WiFi operations, such as device discovery, connection and set-up. In some embodiments, the discovery processing unit 34 is configured to implement P2P and/or TDLS discovery functions. In an embodiment, the discovery processing unit 34 is similar to the discovery processing unit 24 of device 12.

In an embodiment, the application processing unit 36 is configured to execute applications that provide one or more services that may be utilized by other devices within communication system 10 (e.g., device 12), such as an application that responds to requests to find/identify friends, or applications that provide printing services, playing or displaying media, providing media content, gaming services, etc. In particular, in the scenario reflected in FIGS. 1 and 2, the application processing unit 36 of device 14-1 is configured to execute one or more applications providing services, with at least one of those services being a service that can be utilized by at least one application executed by application processing unit 26 of device 12. In some embodiments, the application processing unit 36 is also configured to execute one or more applications that can utilize services provided by other devices on network 10 (e.g., device 12 and/or any of devices 14-2 through 14-6). In an embodiment, the application processing unit 36 is similar to the application processing unit 26 of device 12.

In an embodiment, the memory 38 is a non-transitory, tangible, computer-readable memory that includes one or more volatile and/or nonvolatile memories, such as RAM and/or ROM, for example. The memory 38 in some embodiments stores instructions that are executed by the application processing unit 36, the discovery processing unit 34, and/or the PHY processing unit 30. Additionally (or alternatively), in some embodiments, the memory 38 stores other information, such as Bloom filters and/or device identifiers, as is discussed in further detail below.

In some embodiments, devices 14-2 through 14-6 of FIG. 1 are the same as or similar to device 14-1 as shown in FIG. 2.

Discovery procedures taking place within communication system 10 will now be described, according to one embodiment and scenario. In this embodiment and scenario, each of devices 12 and 14-1 through 14-6 (e.g., each of seven smartphones, in an embodiment) executes a "friend finder" application that may be used to find/identify friends of the respective device owner. To accomplish this, in an embodiment, a first device executing the application (in this scenario, device 12) transmits service discovery requests, and other devices also executing the application (in this scenario, devices 14-1 through 14-6) provide service discovery responses that contain identifying information, such as media access control (MAC) addresses of the respective devices. In this embodiment, the "service" being sought may be viewed as the provision of identifying information that conforms to the format used by the friend finder application. In the embodiment discussed here, the friend finder application gathers a list of other devices that are nearby and also executing the friend finder application, regardless of whether those other devices are owned by "friends." Therefore, in this embodiment, device 12 would seek to learn that devices 14-1 through 14-6 are executing the friend finder application regardless of whether any or all of those devices belong to "friends" of the owner of device 12.

Figure 3:
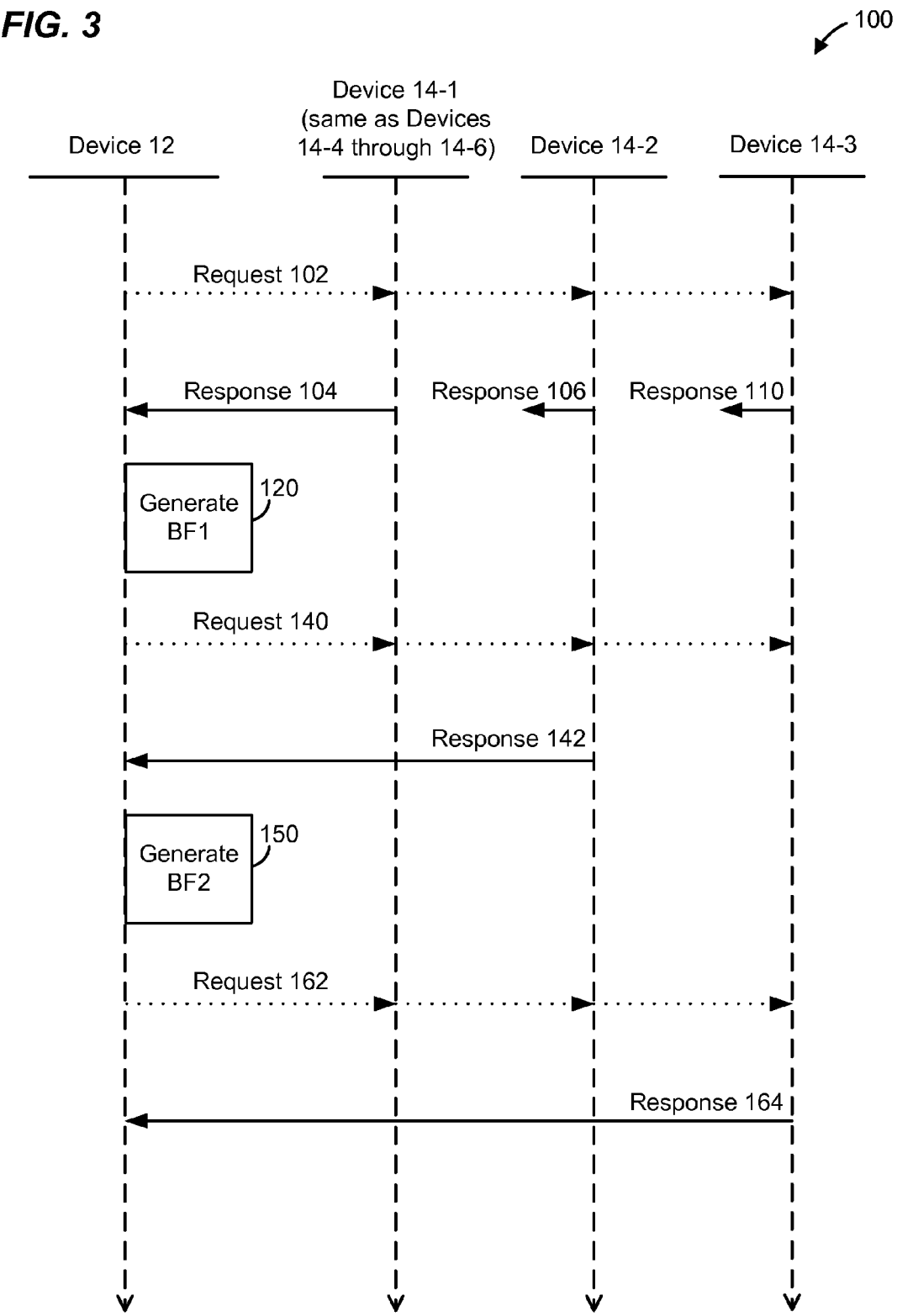
FIG. 3 is a sequence diagram showing a discovery procedure within the example communication system of FIG. 1, according to an embodiment.

A more detailed description of the service discovery procedure, according to this embodiment and scenario, is now provided with reference primarily to sequence diagram 100 shown in FIG. 3. In FIG. 3, a first (left-most) vertical timeline corresponds to device 12 of FIG. 1, a second vertical timeline corresponds to device 14-1 of FIG. 1 (and is the same as the timelines, not shown in FIG. 3, corresponding to devices 14-4 through 14-6 of FIG. 1), a third vertical timeline corresponds to device 14-2 of FIG. 1, and a fourth vertical timeline corresponds to device 14-3 of FIG. 1, with time advancing in the downward direction. Dotted horizontal lines in FIG. 3 represent service discovery requests, while solid horizontal lines represent service discovery responses. In an embodiment, each of the service discovery messages shown in FIG. 3 is transmitted (or received) via a PHY processing unit (e.g., PHY processing unit 20 or PHY processing unit 30 of FIG. 2), and is generated (or processed) in a discovery processing unit of the transmitting (or receiving) device (e.g., discovery processing unit 24 or discovery processing unit 34 of FIG. 2).

The sequence diagram 100 of FIG. 3 begins at a time when device 12 has already begun executing the friend finder application, but has not yet discovered any other devices also executing the friend finder application. Initially, in an embodiment, device 12 broadcasts a service discovery request 102, which is received by each of devices 14-1 through 14-6. In some embodiments, the service discovery request 102 includes a service identifier corresponding to the requested service (i.e., an identifier corresponding to a service provided by the friend finder application), such as a string identifier (e.g., a Bonjour or UPnP string identifier), a hash of a string identifier, or a portion of a hash of a string identifier, for example. In an embodiment, the service discovery request 102 also includes an address (e.g., a MAC and/or IP address) of device 12 so that other devices will know where to send a service discovery response. Further, in some embodiments, the service discovery request 102 includes an empty Bloom filter (e.g., all "zeros" in the bit string) to indicate that device 12 has not yet discovered any other devices executing the friend finder application. In other embodiments, the service discovery request 102 does not include any Bloom filter because it is the first request of its kind being sent (e.g., the first request after device 12 launches the friend finder application, or the first request in a given amount of time, etc.).

After receiving the service discovery request 102, in an embodiment, device 14-1 sends a service discovery response 104 addressed to device 12 (with devices 14-4 through 14-6 sending similar discovery responses). In some of the embodiments in which the service discovery request 102 included an empty Bloom filter, device 14-1 only sends its service discovery response after determining, based on the empty Bloom filter, that device 14-1 has not yet been discovered (i.e., has not been identified as a device executing the friend finder application). Such a determination is made, in some embodiments, by comparing the received Bloom filter to a locally-generated Bloom filter, as described further below with reference to FIG. 4A.

In an embodiment, the service discovery response 104 includes a service identifier indicating that device 12 is executing the friend finder application. In some embodiments, the service identifier is the same as the service identifier that was included in the service discovery request 102. Moreover, in some embodiments, the service discovery response 104 includes a device identifier associated with device 14-1, such as an address (e.g., a MAC address) of device 14-1. In the scenario of FIG. 3, device 14-2 sends device 12 a service discovery response 106, and device 14-3 sends device 12 a service discovery response 110, but neither of the service discovery responses 106, 110 is received (or properly decoded, etc.) by device 12. In an alternative scenario, device 14-2 and/or device 14-3 never receive(s) service discovery request 102, and therefore never generate(s) response 106 and/or 110. In either scenario, device 12 is not yet made aware that devices 14-2 and 14-3 are executing the friend finder application.

Figure 4A:
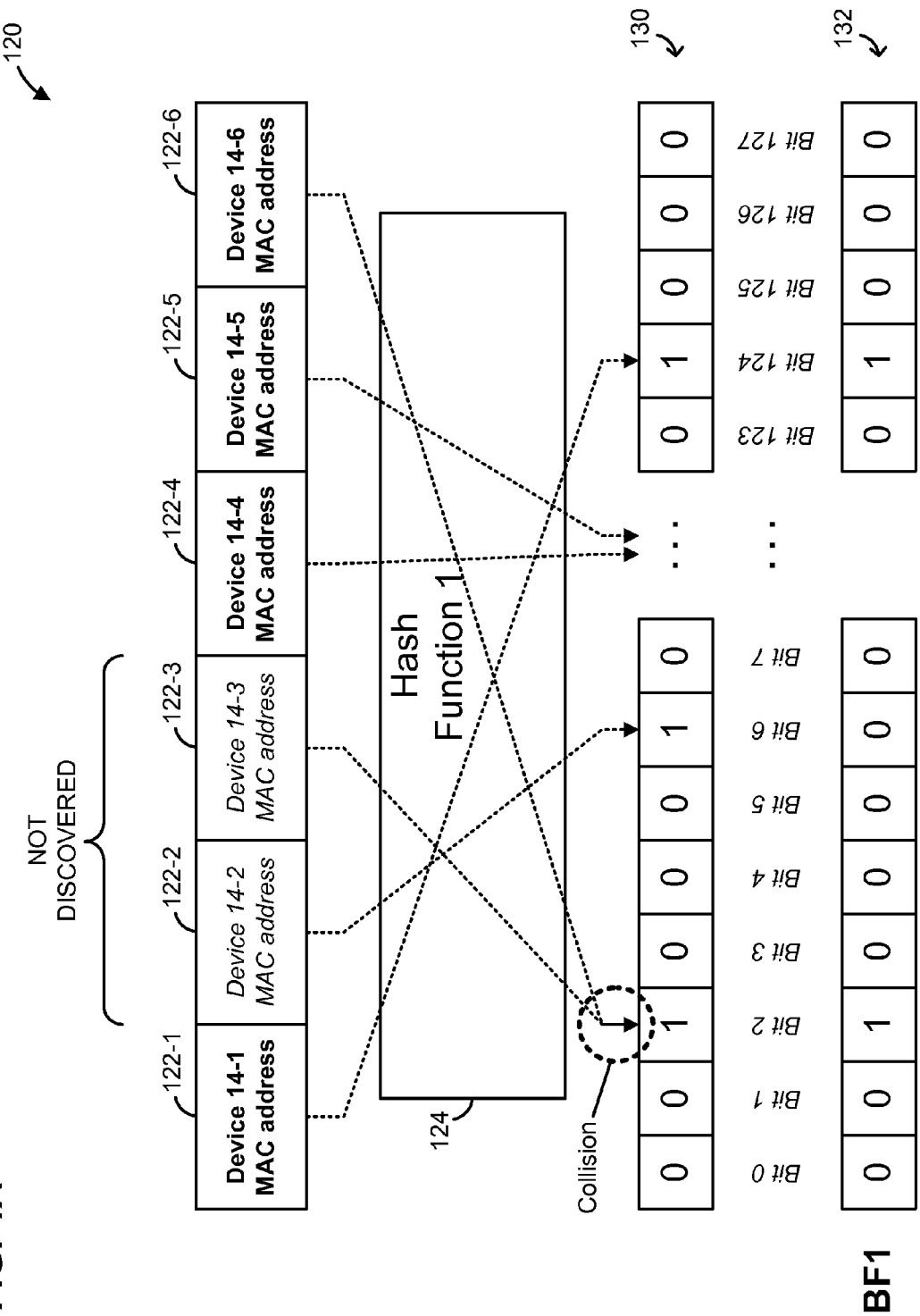
FIG. 4A is a diagram of an example process for using a first hash function to determine bit locations in a Bloom filter based on a set of identifiers, according to one embodiment and scenario.

After receiving service discovery response 104 from device 14-1 (and similar responses from devices 14-4 through 14-6), in an embodiment, device 12 utilizes the device identifier associated with device 14-1 (and the device identifiers associated with devices 14-4 through 14-6) to generate a first Bloom filter (labeled as "BF1" in FIG. 3) via a process 120. In an embodiment, device 14-1 stores received device identifiers in memory 28, and BF1 represents a current value of a Bloom filter also stored in memory 28. The process 120 of generating BF1 is shown in FIG. 4A, according to an embodiment, with device identifiers 122-1 through 122-6 being associated with devices 14-1 through 14-6, respectively. In the example embodiment shown in FIG. 4A, each of the device identifiers 122-1 through 122-6 is a MAC address of the corresponding device. In other embodiments, however, other suitable types of identifiers are used.

In the process 120, a first hash function 124 generally operates on device identifiers to generate Bloom filters. For each device identifier processed by the first hash function 124, in an embodiment, the device identifier is first hashed using a hashing technique, such as a "secure hash algorithm" (e.g., SHA-1 or SHA-256). The first hash function 124 then maps the resulting hash, or a portion of the resulting hash, to a respective bit location in the Bloom filter, in an embodiment. In one embodiment, for example, the first hash function 124 hashes a particular device identifier by using SHA-256 to generate a 256-bit hash, and then maps the first seven of those 256 bits to a bit location in a 128-bit Bloom filter (e.g., 0000000 mapping to a "one" at the location "Bit 0," 0000001 mapping to a "one" at "Bit 1," etc.). In other embodiments, a different suitable hashing and/or mapping technique is used, a different length hash is generated, and/or the Bloom filter has a different bit length.

The Bloom filter 130 shown in FIG. 4A corresponds to an embodiment in which 128-bit Bloom filters are generated, and to a hypothetical scenario in which all of devices 14-1 through 14-6 have been discovered (and, therefore, the first hash function 124 has operated on each of the device identifiers 122-1 through 122-6). As seen in FIG. 4A, each of the device identifiers 122-1 through 122-6 is converted/mapped to a respective bit location in the Bloom filter 130, with the resulting bit location being set to "one" instead of the default "zero." In an alternative embodiment, the Bloom filter 130 instead sets all bits to "one" as the default (empty) state, and each of the device identifiers 122-1 through 122-6 is converted/mapped to a "zero" at the respective bit location.

As seen in FIG. 4A, both device identifier 122-3 and device identifier 122-6 map to the same bit location ("Bit 2") in Bloom filter 130, resulting in the "false positive" situation described above. That is, the "one" at the bit location "Bit 2" is ambiguous because it could mean that device identifier 122-3 is in the group, that device identifier 122-6 is in the group, or both. In the scenario of sequence diagram 100 in FIG. 3, devices 14-2 and 14-3 have not yet been discovered at the time of process 120. Therefore, the process 120 operates on only device identifiers 122-1 and 122-4 through 122-6, resulting in the first Bloom filter (BF1) 132. While not all bit locations are shown in FIG. 4A, it is understood that device identifiers 122-4 and 122-5 also convert/map to respective "ones" at bit locations somewhere in the range between "Bit 8" and "Bit 122" in both Bloom filter 130 and BF1 132.

Referring again to the sequence diagram 100 of FIG. 3, device 12 generates a second service discovery request 140 that again contains the service identifier associated with the friend finder application, but now contains the updated (or newly generated) Bloom filter, BF1 132. In the example scenario of FIG. 3, the service discovery request 140 is received by each of devices 14-1 through 14-6. In an embodiment, each of devices 14-1 through 14-6 generates its own, local version of a Bloom filter by processing its respective device identifier using the first hash function 124. Thus, for example, device 14-1 generates (e.g., in discovery processing unit 34) a local Bloom filter having 128 bit locations, in an embodiment, with a "zero" at every bit location except "Bit 124," which is set to "one." As another example, device 14-2 generates a local Bloom filter having 128 bit locations, in an embodiment, with a "zero" at every bit location except "Bit 6," which is set to "one." In an embodiment, the local Bloom filters are stored in local memories (e.g., memory 38 for device 14-1).

Each of devices 14-1 through 14-6 then compares its locally-generated Bloom filter with BF1 132, in an embodiment. In one embodiment, if BF1 132 has a "one" at the same bit location as the single "one" in the respective local Bloom filter, the device performing the comparison determines that it has already been discovered. Conversely, in this embodiment, if BF1 132 has a "zero" at the same bit location as the single "one" in the respective local Bloom filter, the device performing the comparison determines that it has not yet been discovered. Thus, because BF1 132 has a "one" at the bit locations corresponding to device identifiers 122-1 and 122-4 through 122-6, the respective devices (i.e., devices 14-1 and 14-4 through 14-6) recognize that they have already been discovered, and therefore refrain from transmitting service discovery responses. Also, because BF1 132 has a "zero" at the bit location "Bit 6," device 14-3 concludes that it has not yet been discovered, and sends service discovery response 142, in an embodiment. In an embodiment, service discovery response 142 is similar to service discovery response 106.

Because device identifier 122-6 of device 14-6 caused BF1 132 to have a "one" at bit location "Bit 2," however, device 14-3 mistakenly determines that it has already been discovered. Accordingly, device 14-3 does not send a service discovery response, and device 14-3 remains undiscovered.

In some embodiments and/or scenarios, another process, similar to process 120 but not shown in FIG. 3, is repeated after service discovery response 142 is received by device 12. In one such embodiment/scenario, BF1 132 is modified/updated by processing the device identifier 122-2 of device 14-2 using the first hash function 142, which results in bit location "Bit 6" being changed from a "zero" to a "one" in BF1 132. Also in this embodiment/scenario, device 12 sends an additional service discovery request (not shown in FIG. 3) similar to service discovery request 140, but receives no service discovery responses. No service discovery responses are received (or sent), in such a scenario, because the modified version of BF1 would cause every one of devices 14-1 through 14-6 to believe that it had been discovered (still erroneously, in the case of device 14-3).

Figure 4B:
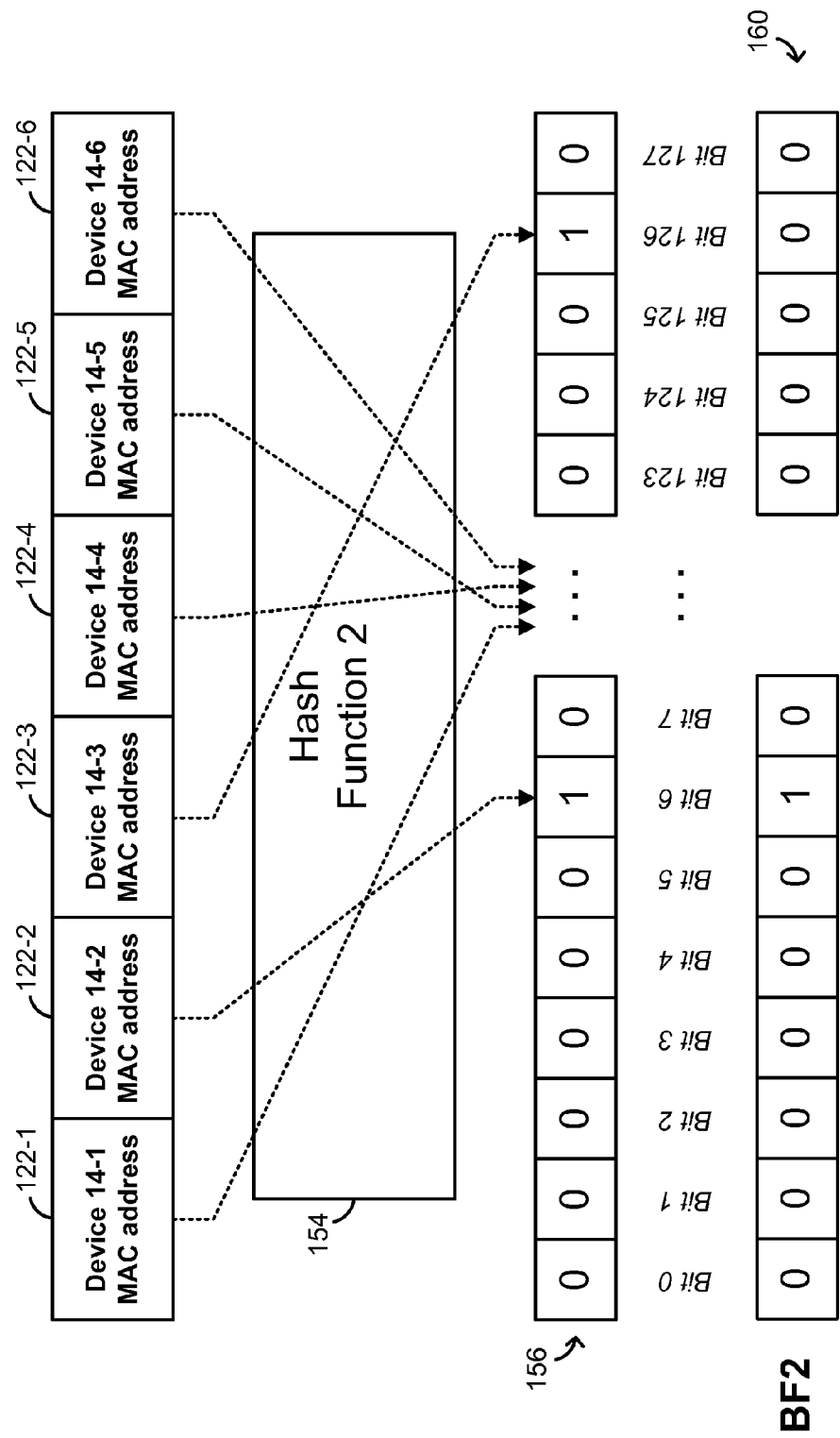
FIG. 4B is a diagram of an example process for using a second hash function to determine bit locations in a Bloom filter based on a set of identifiers, according to one embodiment and scenario.

Regardless of whether device 12 sends a modified version of BF1 132 in a service discovery request, device 12 at some point in time generates a new Bloom filter, BF2, in a process 150. The process 150 of generating BF2 is shown in FIG. 4B, according to one embodiment and scenario. In the process 150, a second hash function 154, different than the first hash function 124, generally operates on device identifiers to generate Bloom filters. Various ways in which the second hash function 154 differs from the first hash function 124 are described below with reference to FIG. 5, according to various embodiments. The second hash function 154 is sufficiently different, however, to cause (or at least, have a high probability of causing) device identifiers to convert/map to different bit locations as compared to the first hash function 124.

The Bloom filter 156 shown in FIG. 4B corresponds to a hypothetical scenario in which all of devices 14-1 through 14-6 have been discovered (and, therefore, the second hash function 154 has operated on each of the device identifiers 122-1 through 122-6). As seen in FIG. 4B, each of the device identifiers 122-1 through 122-6 is converted/mapped to a respective bit location in the Bloom filter 156, with the resulting bit location being set to "one" instead of the default "zero." Because the second hash function 154 differs from the first hash function 124, each of the device identifiers 122-1 through 122-6 is converted/mapped to a different bit location in the Bloom filter 156 than in the Bloom filter 130 of FIG. 4A. Assuming the first hash function 124 and second hash function 154 are uncorrelated (or very loosely correlated), there is only a very small probability that the same ambiguity in Bloom filter 130 will be repeated in Bloom filter 156. In the example scenario of FIG. 4B, no two device identifiers (of devices identifiers 122-1 through 122-6) result in the same bit location in Bloom filter 156, and therefore there is no ambiguity. Even if there were some overlap/ambiguity, however, it is unlikely that the same device identifier affected by the false positive in Bloom filter 130 (i.e., device identifier 122-3) would again be affected by a false positive in Bloom filter 156.

As noted above, in the scenario of sequence diagram 100 in FIG. 3, device 14-3 has not yet been discovered at the time of process 150. Therefore, the process 150 operates only on device identifiers 122-1, 122-2 and 122-4 through 122-6, resulting in the second Bloom filter (BF2) 160. While not all bit locations are shown in FIG. 4B, it is understood that device identifiers 122-1, 122-4, 122-5 and 122-6 also convert/map to respective "ones" at bit locations somewhere in the range between "Bit 8" and "Bit 122" in both Bloom filter 156 and BF2 160.

Referring again to the sequence diagram 100 of FIG. 3, device 12 generates another service discovery request 162 that again contains the service identifier associated with the friend finder application, but now contains the new Bloom filter (i.e., BF2 160 of FIG. 4B), in an embodiment. In the example scenario of FIG. 3, the service discovery request 162 is received by each of devices 14-1 through 14-6. In an embodiment, each of devices 14-1 through 14-6 generates a new local version of a Bloom filter, this time by processing its respective device identifier with the second hash function 154. Thus, for example, device 14-2 generates a new local Bloom filter having 128 bit locations, in an embodiment, with a "zero" at every bit location except "Bit 6," which is set to "one." As another example, device 14-3 generates a new local Bloom filter having 128 bit locations, in an embodiment, with a "zero" at every bit location except "Bit 126," which is set to "one."

Each of devices 14-1 through 14-6 then compares its new locally-generated Bloom filter with BF2 160, in an embodiment. In one embodiment, if BF2 160 has a "one" at the same bit location as the single "one" in the new local Bloom filter, the device performing the comparison determines that it has already been discovered. Conversely, in this embodiment, if BF2 160 has a "zero" at the same bit location as the single "one" in the new local Bloom filter, the device performing the comparison determines that it has not yet been discovered. Thus, because BF2 160 has a "one" at the bit locations corresponding to the device identifiers 122-1, 122-2 and 122-4 through 122-6, the respective devices (i.e., devices 14-1, 14-2 and 14-4 through 14-6) recognize that they have already been discovered, and therefore refrain from transmitting service discovery responses. Also, because BF2 160 has a "zero" at the bit location "Bit 126," device 14-3 now realizes that it in fact has not been discovered, and therefore sends service discovery response 164, in an embodiment. In an embodiment, service discovery response 164 is similar to service discovery response 110. After device 12 receives service discovery response 164, in an embodiment, device 12 updates BF2 160 by processing device identifier 122-3 using the second hash function 154, which results in bit location 126 of BF2 160 being set to "one." Thereafter, in an embodiment, any additional (e.g., periodic) service discovery requests from device 12 will not prompt a service discovery response from any of devices 14-1 through 14-6. In one embodiment, for example, only other devices, newly brought into proximity with device 12 and also executing the friend finder application, will respond to subsequent service discovery requests.

In order for devices 14-1 through 14-6 to generate local Bloom filters that are useful for determining whether the respective device has yet been discovered (e.g., in the manner described above), devices 14-1 through 14-6 generally need to use the same hash function (e.g., hash function 124 or 154) that is used by device 12 to generate the Bloom filter sent within a service discovery request. As noted in the description of sequence diagram 100 above, for example, each of devices 14-1 through 14-6 uses the first hash function 124 to generate a local Bloom filter for comparison with BF1 132, but then uses the second hash function 154 to generate a local Bloom filter for comparison with BF2 160. In various different embodiments, different mechanisms are used to ensure that device 12 and devices 14-1 through 14-6 all use the appropriate hash functions at the appropriate times. In one embodiment, for example, devices 12 and 14-1 through 14-6 are all synchronized, and a protocol defines times or time intervals at which a new hash function is to be implemented. In another example embodiment, devices 12 and 14-1 through 14-6 all listen for public action frames or beacons that announce changes in the current hash function. In other embodiments, the devices 12 and 14-1 through 14-6 use other suitable techniques to determine when a new hash function should be used. It is noted that, while an embodiment and scenario in which only two different hash functions are used has been described, in some embodiments and/or scenarios three or more different hash functions are used, thereby reducing the probability of collision/ambiguity even further.

Figure 5:
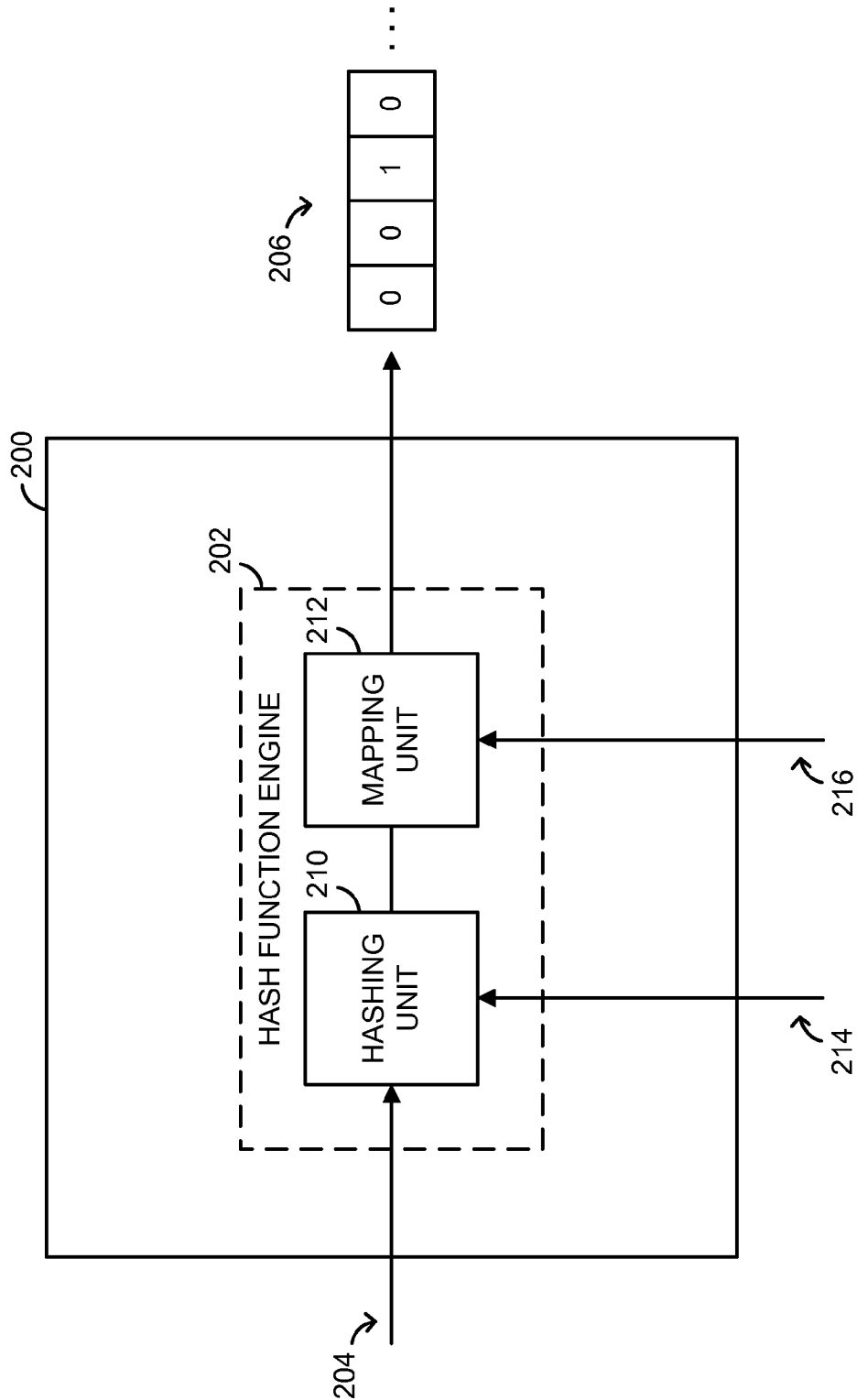
FIG. 5 is a block diagram providing additional detail of a discovery processing unit within a device of FIG. 2, according to an embodiment.

Various techniques for changing the hash function (e.g., such that the first hash function 154 differs from the second hash function 124), are now described in more detail with reference to FIG. 5, according to different embodiments. FIG. 5 shows a discovery processing unit 200, which in some embodiments is discovery processing unit 24 of device 14-1 in FIG. 2, discovery processing unit 34 of device 14-1 in FIG. 2, or a similar discovery processing unit in one of devices 14-2 through 14-6 in FIG. 1.

In the discovery processing unit 200, a hash function engine 202 implements a hash function by processing a device identifier 204 to generate a Bloom filter 206. In the example embodiment of FIGS. 3, 4A and 4B, for example, the device identifier 204 is a MAC address. The hash function engine 202 includes a hashing unit 210 that generates a hash by processing the device identifier 204 using a suitable hashing technique, such as SHA-1 or SHA-256, for example. The hash function engine 202 also includes a mapping unit 212 that maps the hash output by the hashing unit 210 (or a portion of the hash, or another set of bits calculated using at least a portion of the hash, etc.) to a single bit location in the Bloom filter 206, in an embodiment. In some embodiments, the Bloom filter 206 is a 128-bit bit string, similar to BF1 132 or BF2 160, for example. In other embodiments, the Bloom filter 206 is a different length (e.g., 64 bits, 256 bits, etc.). In an embodiment, the bits of the Bloom filter 206 are stored in a memory similar to memory 28 or memory 38 of FIG. 2.

In some embodiments in which discovery processing unit 200 is included in a device similar to device 12 (i.e., a discovering device), the hash function implemented by hash function 202 operates on each device identifier that the device receives in a service discovery response in order to update the Bloom filter 206 as new devices are discovered. In some embodiments in which discovery processing unit 200 is included in a device similar to device 14-1 (i.e., a device being discovered), the hash function implemented by hash function 202 operates only on the device identifier of that device, and Bloom filter 206 is a local Bloom filter.

In various different embodiments, the hash function implemented by hash function 202 is changed according to any of various different triggers (e.g., at pre-defined times or time intervals, or when indicated by a public action frame or beacon, etc.), as discussed above in connection with sequence diagram 100 of FIG. 3. Moreover, the hash function is changed in different ways, according to different embodiments. In one embodiment, the hash function is changed by using bits provided to the hashing unit 210 via a second input 214. In one such embodiment, each different hash function modifies the device identifier 204 using a set of one or more bits provided via the second input 214, where the set of bits provided via the second input 214 is changed for each new hash function. In one embodiment, for example, the hashing unit 210 concatenates the set of bits provided via the second input 214 with the device identifier 204 prior to hashing. In another example embodiment, the hashing unit 210 uses the set of bits provided via the second input 214 to process the device identifier 204 in a different manner (e.g., using the bits as a mask, etc.) prior to hashing.

In some embodiments, devices 12 and 14-1 through 14-6 are all synchronized, and implement a Time Synchronization Function (TSF) timer. In one such embodiment, current values of one or more TSF timer bits (e.g., the x highest-order bits) are provided via the second input 214 (e.g., for concatenation) whenever a new hash function is needed. In other embodiments, the device containing discovery processing unit 200 receives public action frames or beacons that include a protocol-defined field used for modifying hash functions. In one such embodiment, the bits of the field are provided via the second input 214 (e.g., for concatenation)

whenever a new hash function is needed. In other embodiments, other sources are used to provide sets of bits via the second input 214, preferably with zero (or at least low) correlation between successive sets of bits.

Alternatively (or additionally), in an embodiment, the hash function is changed by using a different mapping technique at mapping unit 212. In one embodiment, for example, the hash function is changed not by changing the hash generated by hashing unit 210, but rather by using a different mapping function to map bits of the hash to a bit location in the Bloom filter 206. Therefore, in some of these embodiments, the hash generated by hashing unit 210 is not necessarily recalculated when the Bloom filter is changed (e.g., from BF1 132 to BF2 160 in the scenario of FIG. 3). Rather, in some of these embodiments, the hashing unit 210 only generates a new hash when a new device identifier is received in a service discovery response.

In some embodiments, the mapping function is changed via bits provided to mapping unit 212 on a control input 216. In one such embodiment, the bits provided via the control input 216 are used by mapping unit 212 as an index to the hash generated by hashing unit 210. In one embodiment in which the Bloom filter 206 is 128 bits long, for example, the control input 216 provides index bits that specify which seven-bit portion of the hash will be used to indicate the bit location in the Bloom filter 206 (e.g., control bits 00000 indicating that the first seven bits of the hash are used, control bits 00001 indicating that the second seven bits of the hash are used, etc.). In another embodiment, the mapping unit 212 automatically advances to the next set of bits in the hash (e.g., the next seven bits of the hash, for a 128-bit Bloom filter 206) whenever a bit on the control input 216 indicates that a new hash function should be used.

Additionally (or alternatively), in some embodiments, the hash function is changed in other suitable ways. In some embodiments, for example, the hash function is changed by changing the hashing technique used by hash function 210. In one such embodiment, the hash function implemented by hash function 210 is changed from SHA-256 to a different, suitable hashing technique.

Figure 6:
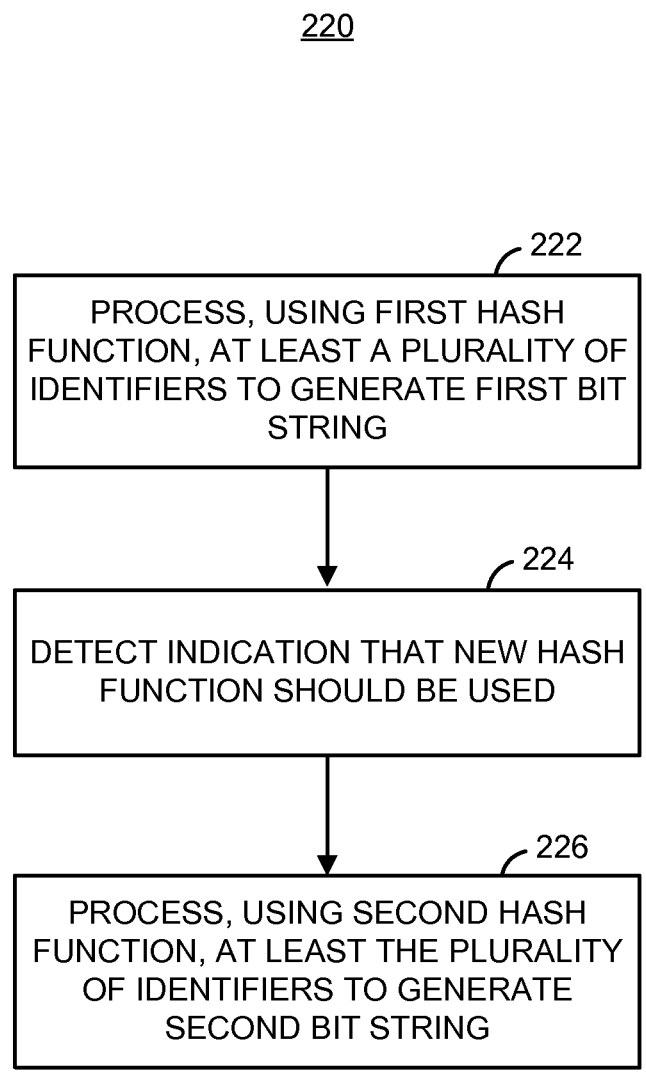
FIG. 6 is a flow diagram of an example method of performing discovery from the perspective of a discovering device, according to an embodiment.

FIG. 6 is a flow diagram of an example method 220 of performing discovery from the perspective of a discovering device, according to an embodiment. The method 220 is implemented in a first communication device. In one embodiment, for example, the method 220 is implemented in device 12 of FIGS. 1 and 2. More specifically, in one embodiment, the method 220 is implemented by the discovery processing unit 24 of device 12. In other embodiments, the method 220 is implemented in part by the discovery processing unit 24, and in part by one or more other processing units of device 12 (e.g., PHY processing unit 20, application processing unit 26, and/or one or more other processing units not shown in FIG. 2).

At block 222, at least a plurality of identifiers is processed to generate a first bit string. In some embodiments, each of the identifiers is associated with a respective communication device. In one embodiment, for example, the identifiers are MAC addresses of the devices. The plurality of identifiers are processed at block 222 using a first hash function. In various embodiments, the first hash function utilizes a hashing technique such as SHA-1, SHA-256, or any other suitable hashing technique.

In some embodiments, processing at least the plurality of identifiers at block 222 includes, for each identifier, hashing a concatenation of the respective identifier and a first set of one or more bits. In one embodiment, for example, the first set of bits corresponds to at least one of a set of bits representing a TSF timer value (e.g., the x highest-order bits) at a first time. In another example embodiment, the first set of bits corresponds to a parameter in a field of a particular frame (e.g., public action frame) or beacon. In other embodiments, another suitable set of bits is concatenated with each identifier.

In one embodiment and/or scenario, all identifiers of the plurality of identifiers are processed in parallel at block 222. In other embodiments and/or scenarios, different identifiers are processed at different times to generate the first bit string, with specific bit locations in the first bit string being updated/modified as each new identifier is processed.

The first bit string generated at block 222 is indicative of whether each of the plurality of identifiers processed at block 222 is included in a group. In one embodiment, for example, the first bit string is indicative of whether each of the identifiers is included in a group of communication devices that have been successfully discovered by the first communication device implementing the method 220 (e.g., a group of communication devices supporting a service requested by the first communication device). In some embodiments, the first bit string is a first Bloom filter.

At block 224, an indication that a new hash function should be used is detected. In various embodiments, detecting the indication includes detecting a parameter in a frame (e.g., public action frame) or beacon received by the first communication device, detecting a particular time (e.g., if the discovering and discovered devices are synchronized), and/or detecting a slot or sequence number (e.g., a slot or sequence number associated with any transmitted or received beacon, frame or other data unit).

At block 226, in response to detecting (at block 224) the indication that a new hash function should be used, at least the plurality of identifiers is processed to generate a second bit string. Each identifier is processed at block 226 using a second hash function different than the first hash function that was used at block 222. In various embodiments, the second hash function utilizes a hashing technique such as SHA-1, SHA-256, or any other suitable hashing technique. In one embodiment, the second hash function uses a hashing technique that is the same as the hashing technique used by the first hash function (e.g., both use SHA-1, or both use SHA-256, etc.). In another embodiment, the second hash function uses a different hashing technique than the first hash function.

In some embodiments in which concatenation with a first set of bits is used at block 222 (as discussed above), processing at least the plurality of identifiers at block 226 includes, for each identifier, hashing a concatenation of the respective identifier and a different, second set of one or more bits. In one embodiment, for example, the first set of bits corresponds to at least one of a set of bits representing a TSF timer value at a first time, and the second set of bits corresponds to at least one of a set of bits representing the TSF timer value at a later, second time. In another example embodiment, the first set of bits corresponds to a parameter in a field of a first frame (e.g., public action frame) or beacon, and the second set of bits corresponds to a parameter in the same field of a different, second frame or beacon. In other embodiments, another suitable set of bits is concatenated with each identifier.

In one embodiment and/or scenario, all identifiers of the plurality of identifiers are processed in parallel at block 226. In other embodiments and/or scenarios, different identifiers are processed at different times to generate the second bit string, with specific bit locations in the second bit string being updated/modified as each new identifier is processed.

Like the first bit string generated at block 222, the second bit string is indicative of whether each of the plurality of identifiers is included in the group (e.g., the group of successfully discovered communication devices). Because the second hash function differs from the first hash function, however, it is highly likely that a given identifier will map to a different bit location in the second bit string than in the first bit string. As discussed above, this diversity makes it extremely unlikely that a collision (false positive) will occur for the same identifier in both bit strings. In some embodiments, both the first bit string and the second bit string are Bloom filters.

In some embodiments, the method 220 includes additional blocks not shown in FIG. 6. In one embodiment, for example, the method 220 includes a first additional block, prior to block 222, in which the first communication device implementing the method 220 is caused to send a first discovery request, and a second additional block, also prior to block 222, in which a first plurality of discovery responses is received. In one such embodiment, each of the received discovery responses contains a respective one of the plurality of identifiers, which are then processed at block 222. Further, in an embodiment, the method 220 includes a third additional block, after block 222, in which the first communication device is caused to transmit a second discovery request containing the first bit string generated at block 222, and a fourth additional block, after block 226, in which the first communication device is caused to transmit a third discovery request containing the second bit string generated at block 226.

In other embodiments, the method 220 includes an additional block, prior to block 222, in which a plurality of hashes are generated, with each hash corresponding to a different one of the plurality of identifiers that are later processed at blocks 222 and 226. In one such embodiment, processing at least the plurality of identifiers using the first hash function at block 222 includes, for each of the plurality of identifiers, utilizing a first index value to determine which portion of the corresponding hash (i.e., the hash generated from that identifier) to map to a location in the first bit string, and processing at least the plurality of identifiers using the second hash function at block 226 includes, for each of the plurality of identifiers, utilizing a different, second index value to determine which portion of the corresponding hash to map to a location in the second bit string.

Figure 7:
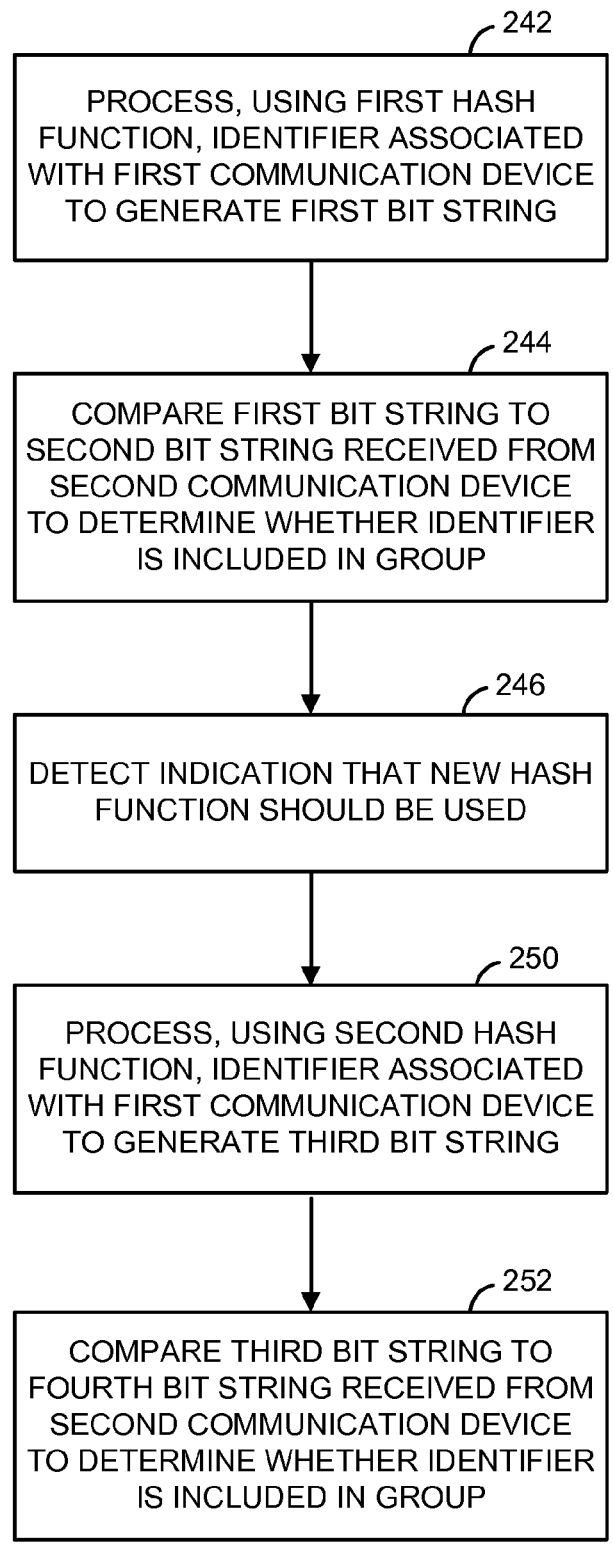
FIG. 7 is a flow diagram of an example method of performing discovery from the perspective of a device being discovered, according to an embodiment.

FIG. 7 is a flow diagram of an example method 240 of performing discovery from the perspective of a device being discovered, according to an embodiment. The method 240 is implemented in a first communication device. In one embodiment, for example, the method 240 is implemented in device 14-1 of FIGS. 1 and 2. More specifically, in one embodiment, the method 240 is implemented by the discovery processing unit 34 of device 14-1. In other embodiments, the method 240 is implemented in part by the discovery processing unit 34, and in part by one or more other processing units of device 14-1 (e.g., PHY processing unit 30, application processing unit 36, and/or one or more other processing units not shown in FIG. 2).

At block 242, an identifier associated with the first communication device implementing the method 240 is processed to generate a first bit string. In one embodiment, the identifier is a MAC address of the first communication device. The identifier is processed at block 242 using a first hash function. In various embodiments, the first hash function utilizes a hashing technique such as SHA-1, SHA-256, or any other suitable hashing technique.

In some embodiments, processing the identifier at block 242 includes hashing a concatenation of the identifier and a first set of one or more bits. In one embodiment, for example, the first set of bits corresponds to at least one of a set of bits representing a TSF timer value (e.g., the x highest-order bits) at a first time. In another example embodiment, the first set of bits corresponds to a parameter in a field of a particular frame (e.g., public action frame) or beacon. In other embodiments, another suitable set of bits is concatenated with the identifier.

At block 244, the first bit string generated at block 242 is compared to a second bit string, received from a second communication device, to determine whether the identifier associated with the first communication device is included in a group. In one embodiment, for example, the comparison is made to determine whether each the identifier is included in a group of communication devices that has been successfully discovered by the second communication device (e.g., a group of communication devices supporting a service requested by the second communication device). In an embodiment, both the first bit string and the second bit string are Bloom filters.

At block 246, an indication that a new hash function should be used is detected. In various embodiments, detecting the indication includes detecting a parameter in a frame (e.g., public action frame) or beacon received by the first communication device, detecting a particular time (e.g., if the discovering and discovered devices are synchronized), and/or detecting a slot or sequence number (e.g., a slot or sequence number associated with any transmitted or received beacon, frame or other data unit).

At block 250, in response to detecting (at block 246) the indication that a new hash function should be used, the identifier associated with the first communication device is processed to generate a third bit string. The identifier is processed at block 250 using a second hash function different than the first hash function used at block 242. In various embodiments, the second hash function utilizes a hashing technique such as SHA-1, SHA-256, or any other suitable hashing technique. In one embodiment, the second hash function uses a hashing technique that is the same as the hashing technique used by the first hash function (e.g., both use SHA-1, or both use SHA-256, etc.). In another embodiment, the second hash function uses a different hashing technique than the first hash function.

In some embodiments in which concatenation with a first set of bits is used at block 242 (as discussed above), processing the identifier at block 250 includes hashing a concatenation of the identifier and a different, second set of one or more bits. In one embodiment, for example, the first set of bits corresponds to at least one of a set of bits representing a TSF timer value at a first time, and the second set of bits corresponds to at least one of a set of bits representing the TSF timer value at a later, second time. In another example embodiment, the first set of bits corresponds to a parameter in a field of a first frame (e.g., public action frame) or beacon, and the second set of bits corresponds to a parameter in the same field of a different, second frame or beacon. In other embodiments, another suitable set of bits is concatenated with the identifier.

At block 252, the third bit string generated at block 250 is compared to a fourth bit string, received from the second communication device, to again determine whether the identifier associated with the first communication device is included in the group. Because the second hash function differs from the first hash function, it is highly likely that the identifier will map to a different bit location in the third and fourth bit strings as compared to the first and second bit strings. As discussed above, this diversity makes it extremely unlikely that a collision (false positive) will occur for the identifier when both comparisons are made (i.e., at blocks 244 and 252). In some embodiments, the first bit string, the second bit string, the third bit string, and the fourth bit string are all Bloom filters.

In some embodiments, the method 240 includes additional blocks not shown in FIG. 7. In one embodiment, for example, the method 240 includes a first additional block, prior to block 244, in which a first discovery request containing the second bit string is received, and a second additional block, prior to block 252, in which a second discovery request containing the fourth bit string is received. In some embodiments, the method 240 includes an additional block, prior to block 242, in which a hash corresponding to the identifier associated with the first communication device is generated. In one such embodiment, processing the identifier at block 242 includes utilizing a first index value to determine which portion of the hash to map to a location in the first bit string, and processing the identifier at block 250 includes utilizing a second index value, different than the first index value, to determine which portion of the hash to map to a location in the third bit string.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, etc. When implemented utilizing a processor executing software or firmware instructions, the software or firmware instructions may be stored in any computer-readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer-readable disk or other transportable computer storage mechanism or via communication media. Communication media typically embodies computer-readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine-readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method of performing discovery, the method comprising:
   processing, at one or more integrated circuits in a first communication device and using a first hash function, at least a plurality of identifiers associated with a plurality of respective second communication devices to generate a first bit string, wherein the first bit string is indicative of whether each of the plurality of second communication devices is included in a group;
   causing, at the one or more integrated circuits, the first communication device to transmit the first bit string so that each second communication device can use the first bit string and the first hash function to determine whether the second communication device is included in the group;
   detecting, at the one or more integrated circuits, an indication that a new hash function should be used;
   in response to detecting the indication that a new hash function should be used, processing, at the one or more integrated circuits and using a second hash function different than the first hash function, at least the plurality of identifiers to generate a second bit string, wherein the second bit string is indicative of whether each of the plurality of second communication devices is included in the group; and
   causing, at the one or more integrated circuits, the first communication device to transmit the second bit string so that each second communication device can use the second bit string and the second hash function to determine whether the second communication device is included in the group.

2. The method of claim 1, wherein:
   processing at least the plurality of identifiers using the first hash function includes, for each identifier of the plurality of identifiers, hashing a concatenation of (i) the respective identifier and (ii) a first set of one or more bits; and
   processing at least the plurality of identifiers using the second hash function includes, for each identifier of the plurality of identifiers, hashing a concatenation of (i) the respective identifier and (ii) a second set of one or more bits different than the first set of one or more bits.

3. The method of claim 2, wherein:
   the first set of one or more bits corresponds to at least one bit of a set of bits representing a Time Synchronization Function (TSF) timer value at a first time; and
   the second set of one or more bits corresponds to at least one bit of a set of bits representing a TSF timer value at a second time later than the first time.

4. The method of claim 1, further comprising, prior to processing at least the plurality of identifiers using the first hash function:
   causing, at the one or more integrated circuits, the first communication device to send a first discovery request; and
   receiving, at the one or more integrated circuits, a first plurality of discovery responses, wherein each discovery response of the first plurality of discovery responses contains a respective one of the plurality of identifiers.

5. The method of claim 4, further comprising:
   after processing at least the plurality of identifiers using the first hash function, causing at the one or more integrated circuits, the first communication device to transmit a second discovery request containing the first bit string; and after processing at least the plurality of identifiers using the second hash function, causing, at the one or more integrated circuits, the first communication device to transmit a third discovery request containing the second bit string.

6. The method of claim 1, wherein the first bit string is a first Bloom filter, and wherein the second bit string is a second Bloom filter.

7. The method of claim 1, wherein detecting the indication that a new hash function should be used includes detecting at least one of (i) a parameter in a beacon or frame received by the first communication device, (ii) a time, and (iii) a slot or sequence number.

8. The method of claim 1, further comprising, prior to processing at least the plurality of identifiers using the first hash function, generating, at the one or more integrated circuits, a plurality of hashes, wherein:
   each hash of the plurality of hashes corresponds to a different one of the plurality of identifiers;
   processing at least the plurality of identifiers using the first hash function includes, for each identifier of the plurality of identifiers, utilizing a first index value to determine which portion of the corresponding hash to map to a location in the first bit string; and
   processing at least the plurality of identifiers using the second hash function includes, for each identifier of the plurality of identifiers, utilizing a second index value different than the first index value to determine which portion of the corresponding hash to map to a location in the second bit string.

9. A processor configured to execute computer-readable instructions, wherein the processor is implemented on the one or more integrated circuits of claim 1.

10. The method of claim 1, wherein the one or more integrated circuits include one or both of hardware circuitry and software.

11. A non-transitory, tangible, computer-readable memory storing instructions that, when executed by one or more processors in a first communication device, cause the one or more processors to:
   process, using a first hash function, at least a plurality of identifiers associated with a plurality of respective second communication devices to generate a first bit string, wherein the first bit string is indicative of whether each of the plurality of second communication devices is included in a group;
   cause the first communication device to transmit the first bit string so that each second communication device can use the first bit string and the first hash function to determine whether the second communication device is included in the group;
   detect an indication that a new hash function should be used;
   in response to detecting the indication that a new hash function should be used, process, using a second hash function different than the first hash function, at least the plurality of identifiers to generate a second bit string, wherein the second bit string is indicative of whether each of the plurality of second communication devices is included in the group; and
   cause the first communication device to transmit the second bit string so that each second communication device can use the second bit string and the second hash function to determine whether the second communication device is included in the group.

12. The non-transitory, tangible, computer-readable memory of claim 11, wherein:
   the instructions further cause the one or more processors to, prior to processing at least the plurality of identifiers using the first hash function, cause the first communication device to send a first discovery request; and
   each identifier of the plurality of identifiers is contained in a respective one of a first plurality of discovery responses received at the first communication device.

13. The non-transitory, tangible, computer-readable memory of claim 12, wherein the instructions further cause the one or more processors to:
   after processing at least the plurality of identifiers using the first hash function, cause the first communication device to transmit a second discovery request containing the first bit string; and
   after processing at least the plurality of identifiers using the second hash function, cause the first communication device to transmit a third discovery request containing the second bit string.

14. The non-transitory, tangible, computer-readable memory of claim 11, wherein:
   the instructions cause the one or more processors to process each identifier of the plurality of identifiers using the first hash function at least by, for each identifier of the plurality of identifiers, hashing a concatenation of (i) the respective identifier and (ii) a first set of one or more bits; and
   the instructions cause the one or more processors to process each identifier of the plurality of identifiers using the second hash function at least by, for each identifier of the plurality of identifiers, hashing a concatenation of (i) the respective identifier and (ii) a second set of one or more bits different than the first set of one or more bits.

15. The non-transitory, tangible, computer-readable memory of claim 14, wherein:
   the first set of one or more bits corresponds to at least one bit of a set of bits representing a Time Synchronization Function (TSF) timer value at a first time; and
   the second set of one or more bits corresponds to at least one bit of a set of bits representing a TSF timer value at a second time later than the first time.

16. The non-transitory, tangible, computer-readable memory of claim 11, wherein the first bit string is a first Bloom filter, and wherein the second bit string is a second Bloom filter.

17. The non-transitory, tangible, computer-readable memory of claim 11, wherein the instructions cause the one or more processors to detect the indication that a new hash function should be used at least by detecting at least one of (i) a parameter in a beacon or frame received by the first communication device, (ii) a time, and (iii) a slot or sequence number.

18. The non-transitory, tangible, computer-readable memory of claim 11, wherein the instructions further cause the one or more processors to, prior to processing at least the plurality of identifiers using the first hash function, generate a plurality of hashes, wherein:
   each hash of the plurality of hashes corresponds to a different one of the plurality of identifiers;
   the instructions cause the one or more processors to process each identifier of the plurality of identifiers using the first hash function at least by, for each identifier of the plurality of identifiers, utilizing a first index value to determine which portion of the corresponding hash to map to a location in the first bit string; and the instructions cause the one or more processors to
process each identifier of the plurality of identifiers
using the second hash function at least by, for each
identifier of the plurality of identifiers, utilizing a
second index value different than the first index value
to determine which portion of the corresponding hash
to map to a location in the second bit string.

\* \* \* \* \*